(12) United States Patent
Ndao et al.

(10) Patent No.: US 10,020,010 B1
(45) Date of Patent: Jul. 10, 2018

(54) NEAR-FIELD HEAT TRANSFER ENABLED NANOTHERMOMECHANICAL MEMORY AND LOGIC DEVICES

(71) Applicant: The Board of Regents of the University of Nebraska, Lincoln, NE (US)

(72) Inventors: Sidy Ndao, Lincoln, NE (US); Mahmoud Elzouka, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 0 days.

(21) Appl. No.: 15/350,848

(22) Filed: Nov. 14, 2016

Related U.S. Application Data

(60) Provisional application No. 62/255,128, filed on Nov. 13, 2015.

(51) Int. Cl.
*G11B 3/02* (2006.01)
*G11B 13/08* (2006.01)
*G11B 9/14* (2006.01)

(52) U.S. Cl.
CPC .............. *G11B 3/02* (2013.01); *G11B 9/149* (2013.01); *G11B 13/08* (2013.01)

(58) Field of Classification Search
None
See application file for complete search history.

(56) References Cited

U.S. PATENT DOCUMENTS

| 6,917,276 | B1 * | 7/2005 | Menard | F03G 7/065 337/14 |
| 7,416,019 | B2 * | 8/2008 | Osiander | B82Y 30/00 165/96 |
| 8,133,198 | B2 * | 3/2012 | Neer | A61M 5/145 604/131 |

(Continued)

FOREIGN PATENT DOCUMENTS

| FR | 2267595 A | * 12/1975 |
| JP | 2001357765 A | * 12/2001 |
| WO | 2014042907 | 3/2014 |

OTHER PUBLICATIONS

Li, Baowen; Wang, Lei; Casati, Giulio: "Negative Differential Thermal Resistance and Thermal Transistor"; Mar. 9, 2006.

(Continued)

*Primary Examiner* — William J Klimowicz
(74) *Attorney, Agent, or Firm* — Greer, Burns & Crain, Ltd.; Steven P. Fallon

(57) ABSTRACT

A thermomechanical memory/logic device is disclosed. In embodiments, the thermomechanical device includes a first thermally controlled terminal (e.g., hot terminal); a second thermally controlled terminal (e.g., cool terminal/base); a stem or other structure that can be thermally expanded connected to the cool terminal; and a thermal conductive head coupled to the stem. The head can exchange heat with the hot terminal. The stem and head are between the first thermally controlled terminal and the second thermally controlled terminal, wherein the stem expands or contracts (Continued)

in response to heat absorbed or given off by the thermal conductive head, causing the head to move towards the first thermally controlled terminal or towards the second thermally controlled terminal until a stable state is reached. For example, bistable thermal states can be used to implement logic states (e.g., ZERO or ONE states).

16 Claims, 17 Drawing Sheets

(56) References Cited

U.S. PATENT DOCUMENTS

| | | | | |
|---|---|---|---|---|
| 8,776,870 | B2 * | 7/2014 | Chang | B82Y 10/00 165/135 |
| 2009/0277609 | A1 * | 11/2009 | Chang | B82Y 10/00 165/96 |
| 2010/0031990 | A1 | 2/2010 | Francoeur et al. | |
| 2016/0351622 | A1 * | 12/2016 | Gibson | G11C 11/1659 |
| 2017/0229630 | A1 * | 8/2017 | Zhan | H01L 37/02 |

OTHER PUBLICATIONS

Wang, Lei and Li, Baowen: "Thermal Memory: A Storage of Phononic Information"; The American Physical Society, Dec. 31, 2008.

Kubytskyi, Viachelsav; Biehs, Svend-Age; Ben-Abdallah, Philippe: "Radiative Bistability and Thermal Memory"; American Physical Society, Aug. 15, 2014.

Dyakov, S A; Dai, J; Yan, M; Qiu, M: "Near Field Thermal Memory Based on Radiative Phase Bistability of VO2"; Journal of Physics D: Applied Physics, Jul. 2, 2015.

Dyakov, S A; Dai, J; Yan, M: "Near Field Thermal Memory Device"; Nov. 3, 2014.

Ben-Abdallah, Philippe: "Near-Field Thermal Transistor"; Sep. 30, 2013.

* cited by examiner

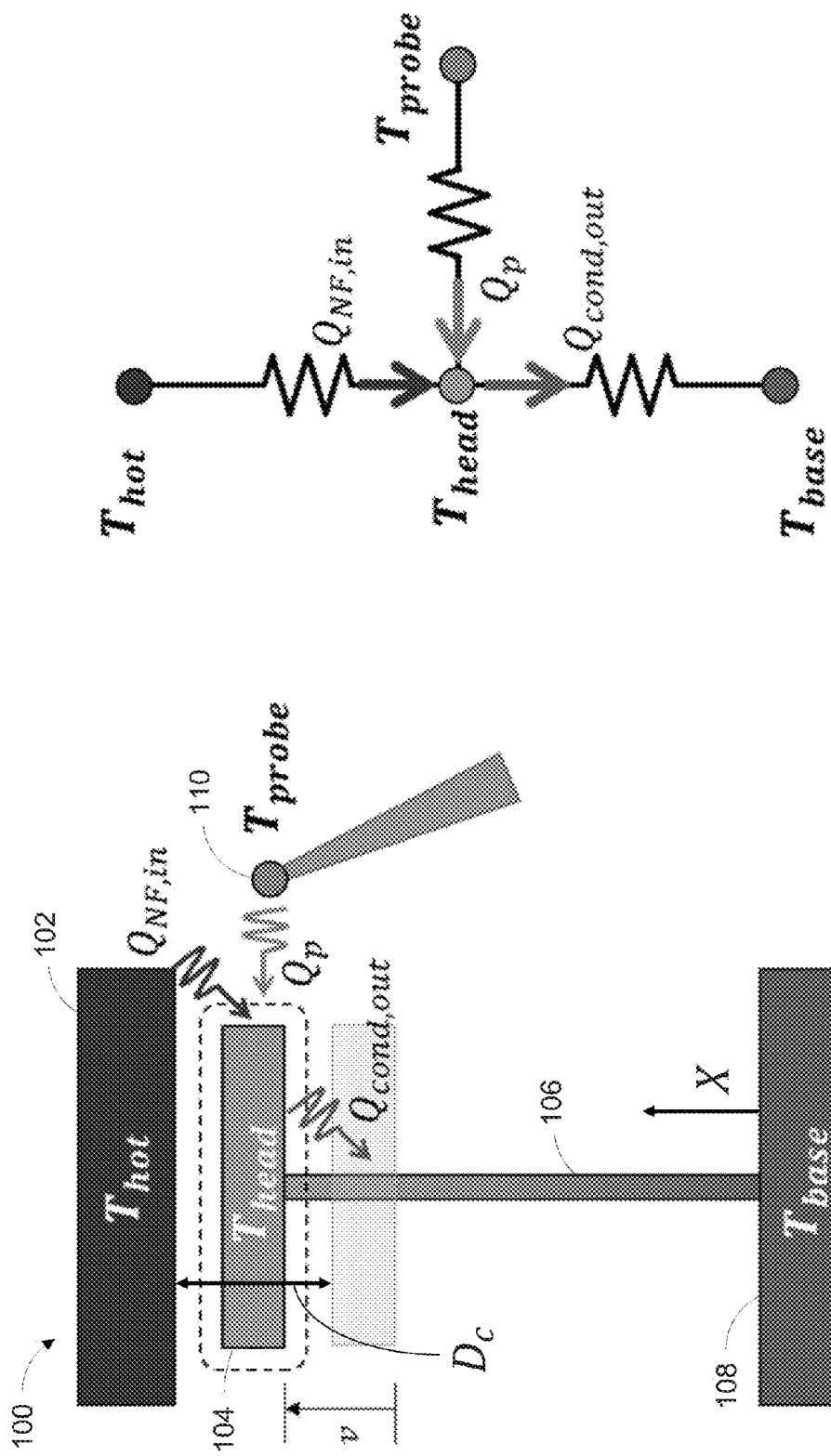

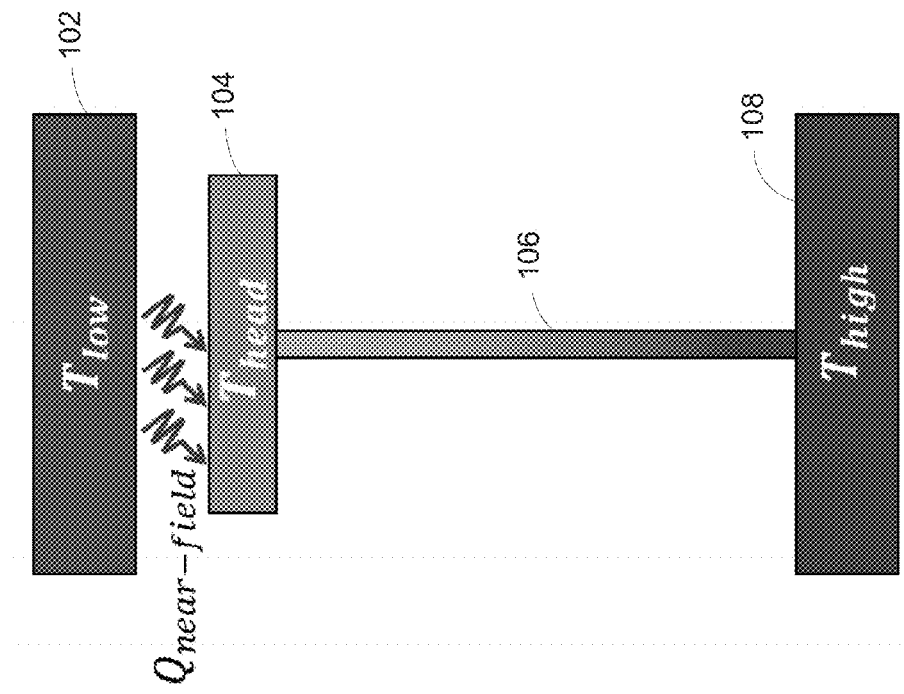
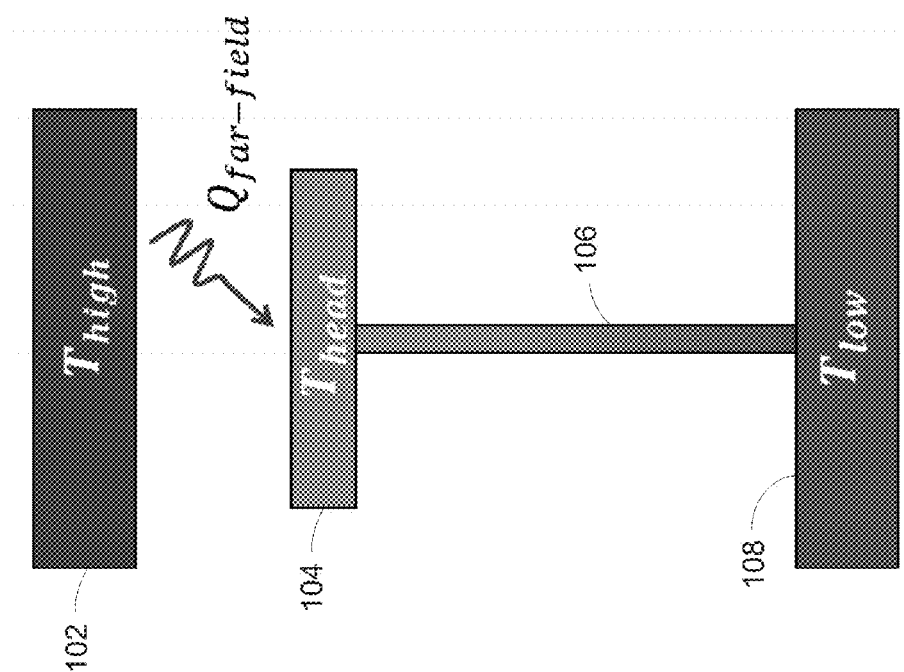
FIG. 4A
FIG. 4B

NEAR-FIELD HEAT TRANSFER ENABLED NANOTHERMOMECHANICAL MEMORY AND LOGIC DEVICES

CROSS-REFERENCE TO RELATED APPLICATIONS

The present application claims the benefit under 35 U.S.C. § 119(e) of U.S. Provisional Patent Application No. 62/255,128, filed Nov. 13, 2015, and titled "NEAR-FIELD HEAT TRANSFER ENABLED NANOTHERMOMECHANICAL MEMORY AND LOGIC DEVICES," which is incorporated herein by reference in its entirety.

FEDERALLY SPONSORED RESEARCH OR DEVELOPMENT

This invention was made with U.S. government support under Grant No. NNX13AB17A awarded by the National Aeronautics and Space Administration (NASA). The U.S. government has certain rights in this invention.

BACKGROUND

Limited performance of electronic memory devices at extreme temperatures, external electric fields, and radiation found in space exploration missions and earth based applications such as deep-well drilling and combustion engines requires the development of alternative computing technologies. Performance degradation of electronic devices at extreme temperatures is due to thermally generated carriers, resulting in intrinsic electrical properties of the P/N doped regions. In the pursuit of alternative technologies, research has been focused on two main approaches, namely, material research (e.g., alternative wide bandgap semiconductor materials such silicon carbide) and nano-electro-mechanical memory and switches both of which still dependent on semiconductor properties and/or electricity.

SUMMARY

Aspects of this disclosure related to memories and logic devices which operate on the principle of thermal rectification and heat flow, as opposed electric current. For example, embodiments of near-field heat transfer enabled nanothermomechanical memory and logic devices are disclosed. Although the term "nanothermomechanical" is used, it is noted that memory or logic devices, in accordance with the disclosed embodiments, can be implemented at other scales (e.g., micro, pico, etc.) without departing from the scope of this disclosure.

Various embodiments of nanothermomechanical memory or logic devices (i.e., thermomechanical device for storing thermal information and for rectifying heat flow) are described below, where memory storage or logic state switching operation is achieved through near-field heat transfer enabled negative differential thermal resistance (NDTR) and thermal latching. For example, a memory or logic device can be implemented by thermomechanical device that achieves one of at least two stable states. In embodiments, the thermomechanical device includes a first thermally controlled terminal (e.g., hot terminal); a second thermally controlled terminal (e.g., cool terminal/base); structure that can be thermally expanded (i.e., a stem) coupled to the cool terminal; and a thermal conductive head coupled to the stem. The stem and head are between the first thermally controlled terminal and the second thermally controlled terminal, wherein the stem expands or contracts in response to heat absorbed or given off by the thermal conductive head, causing the head to move towards or away from the hot terminal until a stable state is reached. For example, bistable thermal states, described in further detail below, can be used to implement logic states (e.g., ZERO or ONE states). The same or a substantially similar device can be used as a thermal memory, as a thermal diode/rectifier, and as a thermal switch that can control heat flow rate from the hot to the cold terminal. It is noted that the thermomechanical memory disclosed herein can also be used to measure near-field thermal radiation exchange between the two bodies, while keeping the separation distance in the range of approximately one micron.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

FIG. 1A is a schematic view of a thermomechanical memory/logic device layout in accordance with an embodiment of this disclosure.

FIG. 1B shows an equivalent thermal circuit of the thermomechanical memory/logic device layout illustrated by FIG. 1A.

FIGS. 4A and 4B illustrate a thermomechanical diode or rectifier and its rectification action when hot and cool terminal are exchanged in accordance with embodiments of this disclosure.

FIG. 9A shows results for thermal rectification, and FIG. 9B shows results for heat transfer between the two bodies.

DETAILED DESCRIPTION

Overview

Figure 1C:
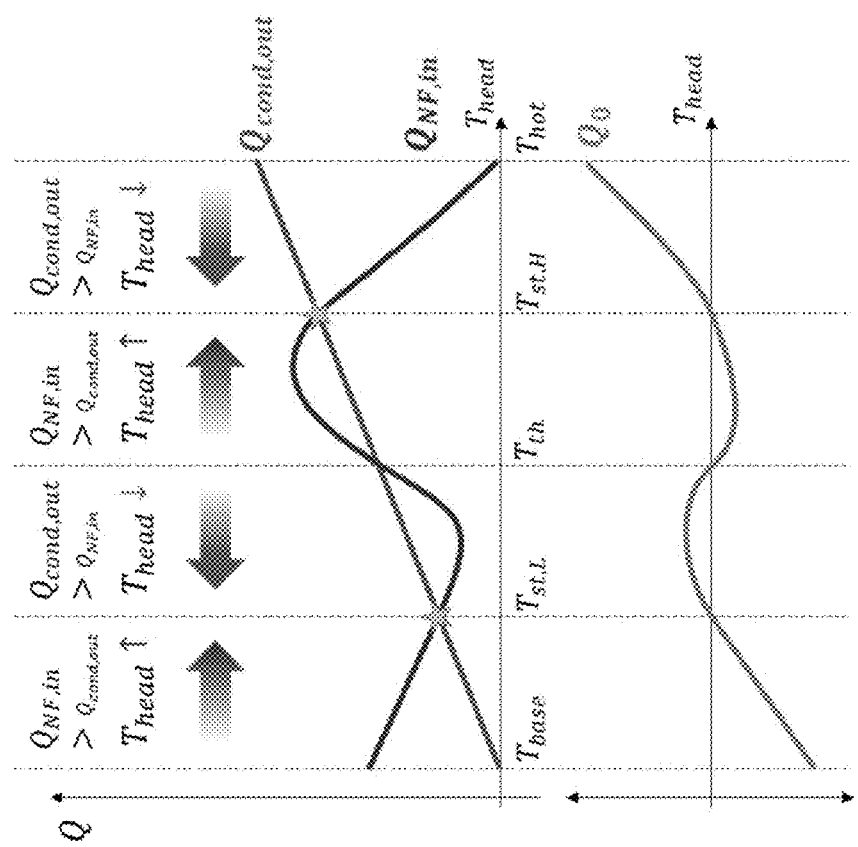
FIG. 1C is a schematic plot that conceptually illustrates the thermomechanical memory action shown in FIG. 1A. The figure shows a plot of near-field radiative heat supplied to a thermally conductive head, $Q_{NF,in}$, heat conduction lost from the head, $Q_{cond,out}$, and net heat transferred from the head ($Q_0 = Q_{cond,out} - Q_{NF,in}$).

Aspects of this disclosure relate to nanothermomechanical memory and logic devices. A nanothermomechanical memory device can use heat instead of electricity to record, store, and recover data, while the nanothermomechanical logic device can undertake a logic operation (e.g., AND, OR, ADD, etc.) utilizing only heat. Memory function is achieved through coupling of near-field thermal radiation and thermal expansion resulting in negative differential thermal resistance and thermal latching, while logic operation can be achieved simply by implementing a number of thermal diodes (similar to electronic logic circuits). The inventors have demonstrated, via numerical modeling, the concept of near-field thermal radiation enabled negative differential thermal resistance that achieves bistable states, along with a study of its dynamic response under write/read cycles. Design and implementation of a practical silicon based nanothermomechanical memory/logic device are disclosed herein. Experimental results show thermal rectification action (i.e., the main feature of thermal diode, the building block of thermal logic circuits). The results can also show measured values of near-field heat transfer between the two bodies. With more than 50% of the world's energy losses being in the form of heat, along with the ever increasing need to develop computer technologies which can operate in harsh environments (e.g., very high temperatures), nanothermomechanical memory and logic devices may be useful in a variety of settings and applications.

Thermal logic and memory are very attractive technologies as information storage, reading, writing, and processing are all thermal, hence the field of phononics—a science and engineering of processing information with heat—the counterpart of electronics. The practicality and feasibility of thus far proposed thermal devices however remains questionable. This disclosure presents a category of thermal devices, referred to herein as "nanothermomechanical" logic and memory devices. Although the term "nanothermomechanical" is used, it is noted that memory or logic devices, in accordance with the disclosed embodiments, can be implemented at other scales (e.g., micro-, pico-, and so forth) without departing from the scope of this disclosure. Various embodiments of nanothermomechanical memory or logic devices (i.e., thermomechanical device for storing one of at least two states) are described below, where memory storage or logic operation is achieved through near-field heat transfer enabled negative differential thermal resistance (NDTR) and thermal latching.

Example Implementations

FIGS. 1A through 9B illustrate implementations and various aspects of thermomechanical memory/logic devices implemented in accordance with various embodiments of this disclosure. Those skilled in the art will appreciate that the embodiments illustrated in the drawings and/or described herein may be fully or partially combined to result in additional embodiments. Substitutions and other modifications can also be made without departing from the scope of this disclosure. Accordingly, the illustrated and described embodiments should be understood as explanatory and not as limitations of the present disclosure.

A bistable thermal system—the heart of thermal memory—is based on nonlinear thermal resistance. Nonlinear thermal resistance, also called negative differential thermal resistance (NDTR), can be achieved through metal insulator transition of a single crystalline $VO_2$ nanobeam and two nonlinear Frenkel-Kontorova lattice segments. The phenomenon of negative differential thermal resistance can be thought of as increase in heat transfer from a hot to a cold body with decreasing temperature difference between the two (which seems to be counterintuitive). Unlike previous NDTR studies, the disclosed nanothermomechanical memory uses the coupling between thermal expansion and near-field radiative heat transfer to achieve NDTR. A memory device 100 shown in FIG. 1A has two terminals: a top terminal 102 and a bottom terminal (base 108, stem 106, and head 104). The top terminal 102 is kept at a high temperature (the hot terminal). For the bottom terminal, temperature is allowed to vary along its length with the base 108 kept at a relatively low temperature (the cold terminal). The base 108 is fixed while the head 104 is free to move up and down as a result of thermal expansion. Data writing is done by slightly heating (e.g., to write ONE) or cooling (e.g., to write ZERO) the head 104 about a threshold temperature ($T_{th}$) using a probe 110. Data reading can be accomplished by measuring the temperature of the head 104. During memory function, heat is transferred from the hot terminal 102 to the head 104 by radiation; from the head 104 to the cold base 108, heat is transferred by conduction through the stem 106. An equivalent thermal circuit diagram of the nanothermomechanical memory 100 is shown in FIG. 1B.

The working principle of the nanothermomechanical memory can be understood by the following scenario. Given FIG. 1A, the head 104 is initially separated from the hot terminal 102 by a distance ($d_c$) such that far-field thermal radiation is the dominant mode of heat transfer between the head 104 and the hot terminal 102. By increasing the temperature of the head 104, the stem 106 elongates, decreasing the separation distance between the hot terminal 102 and the head 104. If the separation distance becomes small enough compared to the thermal radiation dominant wavelength, near-field radiative heat transfer becomes important, causing the heat transfer to increase exponentially beyond that of the far-field with decreasing separation distance. In other words, the higher the temperature of the head 104 is, the smaller the separation distance will be between the head 104 and the hot terminal 102, and therefore higher near-field radiative heat transfer. With careful engineering, the device 100 can be designed such that the increase in heat transfer due to near-field radiation exceeds the decrease in heat transfer from reduced temperature difference between the head 104 and the hot terminal 102, hence achieving negative differential thermal resistance (NTDR).

If we plot the heat conduction through the stem 106 and the near-field radiative heat flux versus head temperature on the same graph, we get the curves shown in FIG. 1C. $Q_0$ is the net heat transfer from the head 104 for a given head temperature (energy conservation requires: $Q_0 = Q_{cond,out} - Q_{NF,in}$). Referring to FIG. 1C, three intersection points between the $Q_{cond,out}$ and $Q_{NF,in}$ curves divide the plot into four regions. The first and third regions from the left feature $Q_{NF,in} > Q_{cond,out}$. If the temperature of the head 104 falls on either of these two regions, it will instantaneously increase or move right to the nearest equilibrium state. On the other hand, the second and fourth regions from the left feature $Q_{NF,in} < Q_{cond,out}$. If the temperature of the head falls on either of these two regions, it will instantaneously decrease or move left. This behavior indicates the existence of more than one stable state. A stable state must have two characteristics: (1) the head 104 must have zero net heat flux in (i.e., $Q_0 = 0$); (2) a stable state must retain its stability when perturbed. If a stable state is perturbed to the left (i.e., experiences temperature decrease), it should return automatically back to its stable state. This requires that the region to the left of the stable state to feature net heat input (i.e., $Q_{NF,in} > Q_{cond,out}$) to increase the temperature of head 104 back to the stable temperature. In contrast, if a stable state is perturbed to the right (i.e., experiences temperature increase), it should return automatically to its stable state requiring net heat loss (i.e., $Q_{NF,in} < Q_{cond,out}$) to decrease the temperature of the head 104. This can be mathematically interpreted by the condition $dQ_0/dT_{head} > 0$.

Applying the above-mentioned stable state criteria, two stable states can be identified at two intersection points marked with stars on FIG. 1C for given device dimensions and boundary conditions. These two stable states correspond to temperatures $T_{st,L}$ and $T_{st,H}$. The third intersection point has zero net heat flux however has a slope $dQ_0/dT_{head} < 0$, making it only a critically stable state (at a threshold temperature $T_{th}$) and not a stable state. If perturbed to the left, a critically stable point will move to the left until it reaches the nearest stable point, vice versa if perturbed to the right. The instantaneous temperature of the head 104 relative to the threshold temperature dictates whether a memory/logic state will settle to the high or low temperature stable state. If the temperature of the head 104 is higher than $T_{th}$, it will eventually settle at $T_{st,H}$; whereas if lower, it will settle at $T_{st,L}$. Change in temperature of the head 104 corresponds to motion of the head 104 relative to the base 108; increasing head 104 temperature translates to smaller separation distance between the head 104 and the hot terminal 102. Therefore, the two stable states correspond to stable positions of the head 104, hence thermal latching. These two thermal latching states are the essence of the memory/logic operability—each one corresponds to a binary ONE or ZERO and can tolerate perturbation (e.g., during memory state reading). The two stable states of ONE and ZERO also correspond to two states/modes of high and low heat transfer rates from the hot terminal 102 to the head 104, which means this technique can be used as a thermal switch. Thermal switches can be employed in thermal storage applications.

The enabling physics of the NDTR is near-field thermal radiation, which is the thermal radiation between two closely spaced bodies when their separation distance is in the order of the characteristic wavelength of thermal radiation. Near-field thermal radiation accounts for the tunneling of evanescent waves (which carry energy with them) when two bodies are brought close enough to each other. Unlike far-field radiation, near-field thermal radiation intensity increases monotonically with the decrease in separation distance and may exceed the blackbody radiation limit.

Near-field radiation is estimated by calculation of the Poynting vector corresponding to the electric and magnetic fields representing thermal radiation. The propagation of electric and magnetic fields is governed by stochastic Maxwell equations and can be estimated with the fluctuation-dissipation theorem. The net spectral near-field thermal radiation emitted by body 1 and which reaches body 2 (considering reflections) can be expressed as:

$$q_{1\to 2}(z_c, \omega, T) = \frac{k_v^2 \Theta(\omega, T)}{2\pi^2} \text{Re} \tag{1}$$

$$\left\{ i\varepsilon''_{r,1}(\omega) \int_0^\infty \frac{k_\rho}{k''_{z,1}} \begin{bmatrix} g^E_{1\to 2,\rho\rho}(k_\rho, z_c, \omega) g^{H*}_{1\to 2,\theta,\rho}(k_\rho, z_c, \omega) + \\ g^E_{1\to 2,\rho z}(k_\rho, z_c, \omega) g^{H*}_{1\to 2,\theta z}(k_\rho, z_c, \omega) - \\ g^E_{1\to 2,\theta\theta}(k_\rho, z_c, \omega) g^{H*}_{1\to 2,\rho\theta}(k_\rho, z_c, \omega) \end{bmatrix} dk_\rho \right\},$$

where $q_{1\to 2}(z_c, \omega, T)$ is the monochromatic radiative heat flux calculated in the receiver (body 2) at distance $z = z_c$ measured from the emitting surface due to a semi-infinite radiation source (body 1), and g are components of electric and magnetic dyadic green functions. Integrating over angular frequency from zero to infinity, we get the total near-field radiation flux emitted by body 1 and received by body 2.

$$q_{NF,1\to 2}(z_c, T) = \int_0^\infty q_{1\to 2}(z_c, \omega, T) d\omega \tag{2}$$

To show device performance as a memory, device dynamics should be considered. Since heat transferred by radiation is faster than conduction—as the first incorporates photons that propagate with the speed of light, while the later consists of phonons or lattice vibrations—device dynamics are dominated by unsteady heat conduction through the stem. This can be represented by a 1D heat diffusion equation:

$$\frac{1}{\alpha} \frac{\partial T(x,t)}{\partial t} = \frac{\partial}{\partial x}\left(\frac{\partial T(x,t)}{\partial x}\right), \tag{3}$$

where x is measured from the stem base (refer to FIGS. 1A through 1C). The initial and boundary conditions are given by:

$$t = 0, \; T(x, 0) = T_{base}, \tag{4}$$

$$x = 0, \; T(0, t) = T_{base}, \tag{5}$$

$$x = L, \; k \frac{\partial T(x,t)}{\partial x}\bigg|_{x=L} = \tag{6}$$

$$\frac{w_{head}}{w_{stem}}(q_{NF,hot\to head}(d_c - v, T_h) - q_{NF,head\to hot}(d_c - v, T(L,t)) + q_p),$$

where v is the head displacement due to beam thermal expansion:

$$v = \int_{x=0}^L \alpha_t(T(x,t) - T_{amb}) dx \tag{7},$$

where $T_{amb} = 300$ K, and $q_p$ is the heat input to the head 104 from an external source (i.e., probe 110) per m² of head 104. For writing mode, $q_p$ is set by controlling the probe 110 temperature ($T_{probe}$):

$$q_p = h(T_{probe} - T(L,t)) \tag{8}.$$

While in reading mode, $q_p$ represents thermal disturbance caused by measurement. h is a prescribed heat transfer coefficient. According to the definition of $q_p$, $T_{probe}$ and $T_{head}$ should have a temperature difference $\Delta T$ based on the amount of heat flow $q_p$ for a given thermal resistance between the probe 110 and the head 104. Setting $T_{probe}$ to a certain temperature (in the case of memory writing) will cause the temperature of the head 104 to change to $T_{probe} \pm \Delta T$. Similarly in the case of memory reading, the temperature of the probe 110, $T_{probe}$, will change and reach $T_{head} \pm \Delta T$. Radiation and convection losses to the environment may be neglected.

A dynamic simulation of the nanothermomechanical memory 100 was carried out using the parameters shown in Table I. The base temperature of the nanothermomechanical memory 100 was set to 600 K to demonstrate device feasibility at high temperatures. Steady state solutions for the near-field radiative heat flux, conduction heat flux, net heat transfer from the head, and separation distance are plotted as a function of head temperature in FIG. 2A—all heat flux quantities are per $m^2$ of the head cross sectional area normal to heat flow direction. Nonlinear behavior of near-field radiation curve causes intersections with the linear conduction heat flux curve in three points corresponding to three states; two stable states at temperatures $T_{st,L}=1038$ K and $T_{st,H}=1341$ K, and one critically stable state at $T_{th}=1223$ K. Complete write/read cycle process of the thermal memory is investigated via solving the unsteady heat conduction in the stem coupled with near-field heat transfer and corresponding thermal expansion.

TABLE I

Thermal memory design parameters
Both top and bottom terminals are made from silicon (Si),
all dimensions are given at 300 K

| | |
|---|---|
| Si thermal conductivity k (W/m · K) | 131 |
| Si density $\rho$ (kg/m$^3$) | 2329 |
| Si specific heat c (kJ /kg · K) | 700 |
| Si coefficient of thermal expansion $\alpha_t$ (1/K) | $2.6 \times 10^{-6}$ |
| Stem length L ($\mu$m) | 1000 |
| Stem width to head width ($w_{stem}/w_{head}$) | 0.003 |
| Initial separation distance $d_c$ ($\mu$m) | 1.8 |
| Base temperature $T_{base}$ (K) | 600 |
| Hot terminal temperature $T_{hot}$ (K) | 1440 |

Figure 2A:
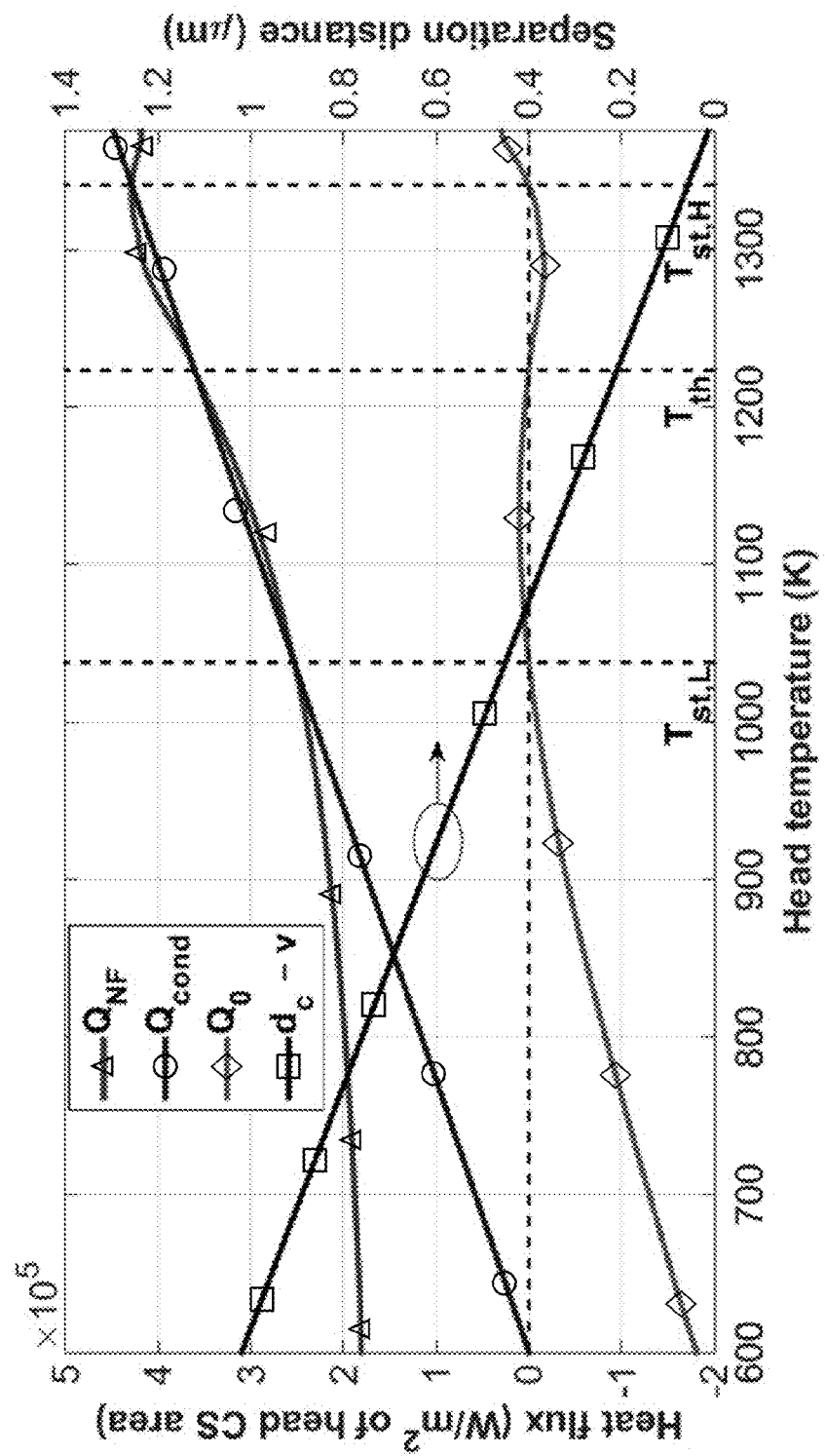
FIG. 2A is a plot for numerical data resulted from thermomechanical memory simulation using data shown in TABLE I, similar to the schematic plot shown in FIG. 1C. The figure shows a plot of near-field thermal radiation, heat conduction to the base, net heat transfer from the head, and separation distance plotted with head temperature.
Figure 2B:
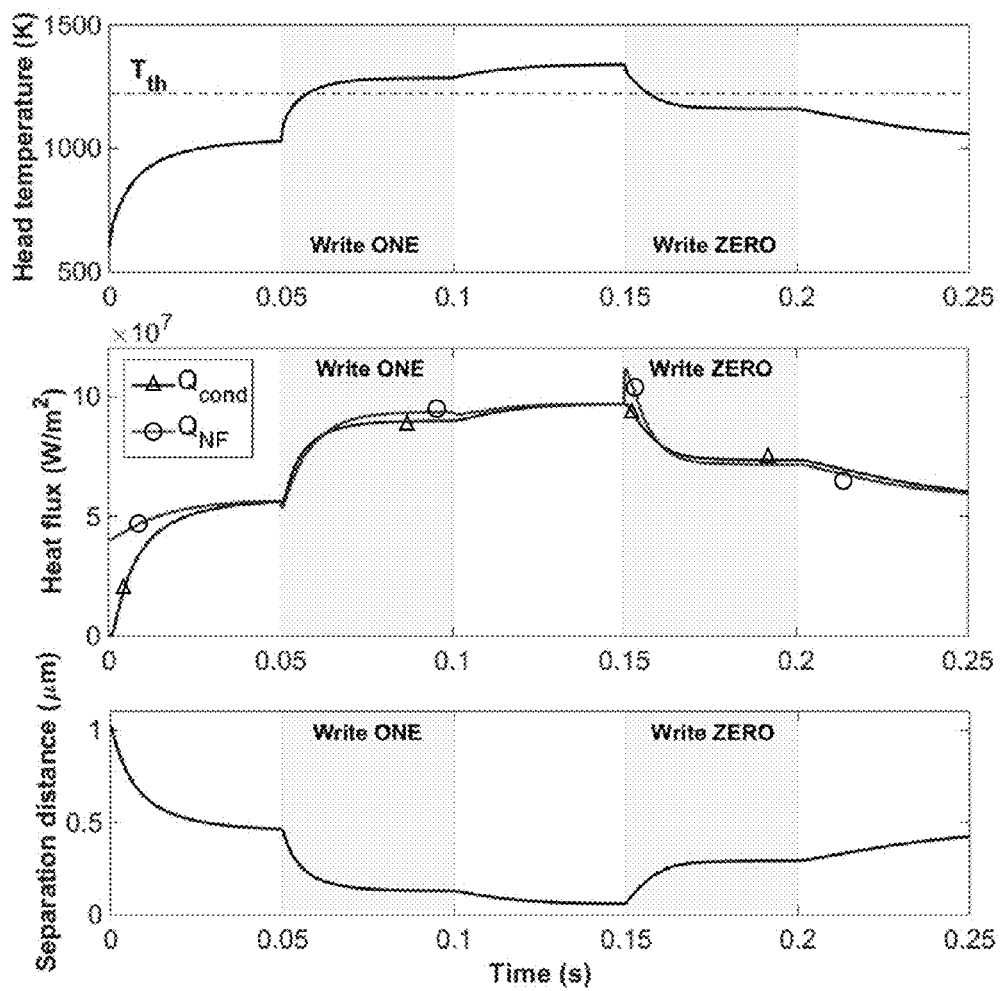
FIG. 2B is plot of an example write/read cycle resulted from numerical simulation of thermomechanical memory shown at FIG. 1A. The frequency of the write/read cycle was purposely chosen to be low for this simulation (e.g., read and write time is 0.05 s) to clearly show system dynamics.

The results are plotted in FIG. 2B and can be categorized into five stages corresponding to the five regions highlighted in the figure. The first stage is device initialization as the beam is initially at the base temperature. At t=0 s, the head 104 is exposed to thermal radiation emitted by the hot terminal 102, causing the temperature of the head 104 to increase until thermal equilibrium is reached ($Q_{NF}=Q_{cond}$) at the lower stable state $T_{st,L}=1038$ K. The second stage comprises writing a state of ONE ("1") to the device 100 (i.e., head temperature at $T_{st,H}$) by setting the probe temperature to 1270 K>$T_{th}$, causing at first the temperature of the head 104 to increase till thermal equilibrium with the probe 110 is reached at $T_{head}=1286$ K. It is counterintuitive that thermal equilibrium is reached at $T_{head}=1286$ K which is higher than the probe set temperature. This indicates that the head 104 is being pulled closer to the hot terminal 102. Note that $Q_{NF}>Q_{cond}$ at the end of the second stage, so a net positive heat is transferred from the head 104 to the probe 110, translating to the head temperature being higher than the probe temperature. Once the effect of the probe 110 is removed (i.e., stop writing) in the third stage, the temperature of the head 104 jumps till equilibrium is reached at the higher stable state, $T_{st,H}=1341$ K, where $Q_{NF}=Q_{cond}$. Memory data reading can be as well accomplished in the third stage with an insulated probe 110 ($Q_p=0$), and therefore $T_{probe}=T_{head}$. By measuring the probe temperature, memory/logic state (e.g., "1" or "0") can be determined. The fourth stage comprises writing a state of ZERO ("0") to the memory/logic device 100 by setting the probe temperature to 1170 K<$T_{th}$, causing the temperature of the head 104 to decrease until thermal equilibrium is reached with the probe 110 at $T_{head}=1161$ K. Similar to the writing of the ONE ("1") state, in stage two, $T_{head}<T_{probe}$ in thermal equilibrium, indicating that the head 104 is pulled away from the hot terminal 102. In the fifth stage, $Q_{cond}>Q_{NF}$ and the temperature of the head 104 decreases smoothly from $T_{head}=1161$ K to the lower stable state $T_{st,L}=1038$ K. In a similar way as in the third stage, data reading can be also accomplished in the fifth stage. FIG. 2B shows also the heat fluxes and separation distances during the simulated write/read cycle. The latching or position of the head 104 in the binary ONE ("1") and ZERO ("0") states correspond to separation distances at the end of the third and fifth stages, respectively. The frequency of the write/read cycle was chosen to be low for this simulation (read and write times are 0.05 s) to clearly show system dynamics (see FIG. 2B). Faster write/read cycle can be achieved by increasing the heat transfer coefficient between the head 104 and probe 110, and/or increasing the temperature difference between head 104 and probe 110 while writing. It is important to note that the nanothermomechanical memory device 100 can operate in high temperature environments; with cold terminal temperatures at least as high as 600 K.

Numerical simulation of the nanothermomechanical memory 100 is disclosed for explanatory purposes and validation. The nanothermomechanical memory 100 (or logic device) uses heat instead of electricity to record, store, and recover data. The working principle of the device lies in the coupling between near-field thermal radiation and thermal expansion of a microbeam (i.e., stem 106). This coupling results in a bistable thermal system with at least two stable states at two different temperatures—this can be translated to at least two memory/logic states (e.g., "0" and "1" states). A dynamic simulation of the write/read cycle shows that the device can be used as a memory as it has two stable temperatures ($T_{st,L}=1038$ K, $T_{st,H}=1341$ K) corresponding to the two binary memory states of ZERO ("0") and ONE ("1"). Switching between memory states is done by setting the probe temperature below or above a threshold value; while reading of states can be done by measuring the temperature of an insulated probe 110. Memory frequency strongly depends on the actual heat transfer coefficient and temperature difference between the probe 110 and the head 104. The nanothermomechanical memory 100 disclosed herein represents a very important step towards the realization of harsh environment and high temperature memory and logic technologies.

Figures 3A, 3B:
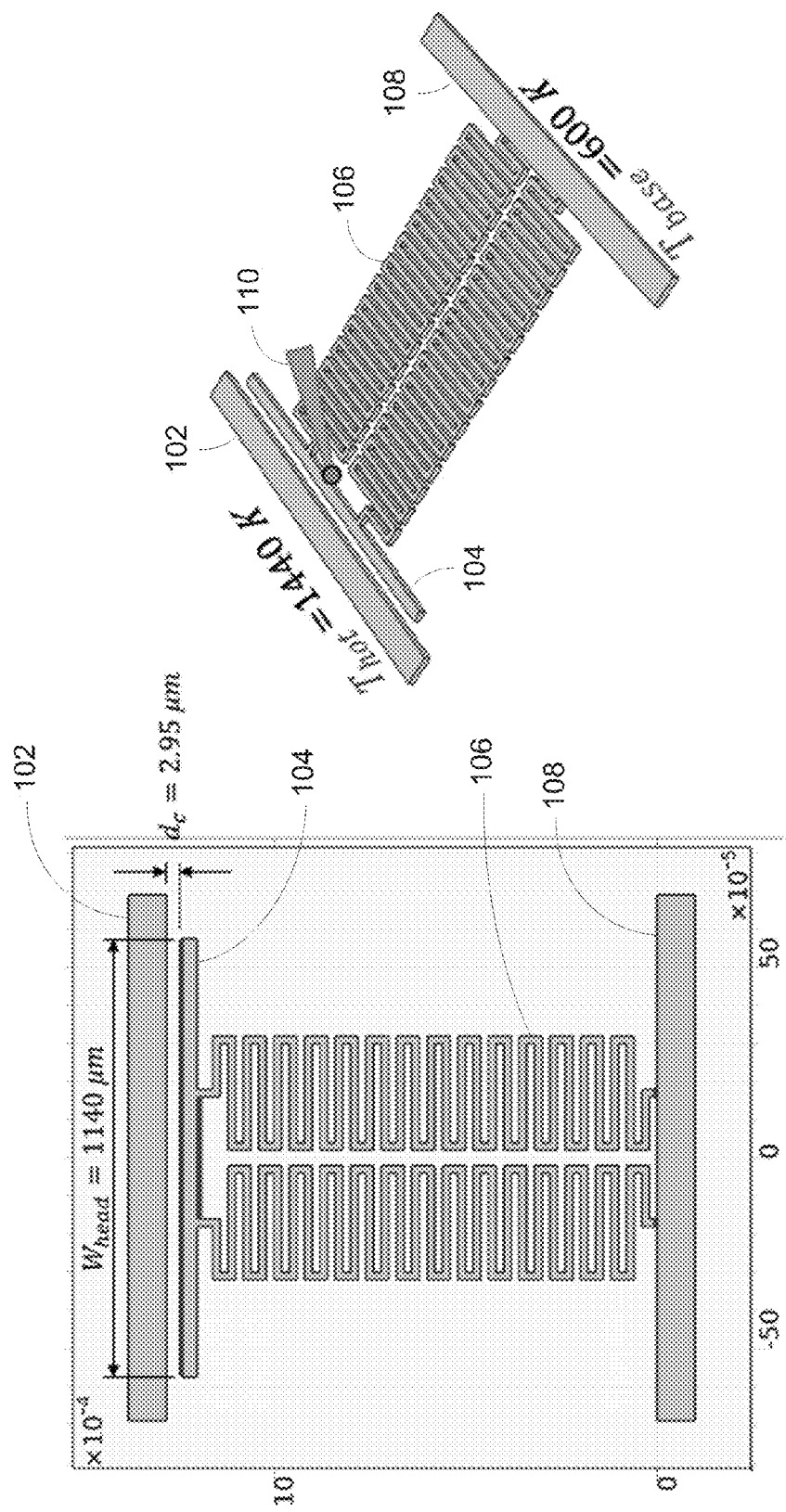
FIGS. 3A and 3B are schematic views of a nanothermomechanical memory/logic device layout in accordance with embodiments of this disclosure.

Additional embodiments, testing devices, and data are shown in FIGS. 3A through 9B. For example, FIGS. 3A and 3B are schematic views of a nanothermomechanical memory/logic device 100, similar to that shown in FIG. 1A. FIGS. 3A and 3B show an embodiment where the stem 106 comprises one, two, or more micro-beams that are zigzag or helically shaped for controlling the conduction losses from the head 104. FIGS. 4A and 4B illustrate embodiments of a thermomechanical diode or rectifier, and its operating principle. The nanothermomecahnical rectifier/diode allows heat flow in a certain direction (i.e., the forward direction), and hinders it from flowing in the opposite direction (i.e., the reverse direction). This simple action is behind all logic operations achieved by electronics. FIG. 4A shows the nanothermomechanical device while heat is flowing in the reverse direction. In this case, the stem 106 (i.e., the structure that can be thermally expanded) is connected to the lower temperature terminal 108, causing less thermal expansion, and causing the gap between the head 104 and the upper hot terminal 102 to be large. The larger gap only allow the far-field thermal radiation mode of heat transfer to be activated, which is featured with less heat transfer rates. When the hot and cool terminals change roles as show in FIG. 4B (i.e., heat flow in the forward direction), the stem 106 is connected to the higher temperature terminal 108, causing higher thermal expansion in the stem 106, and accordingly lower separation distance between the head 104 and the upper cooler terminal 102, leading to the activation of near-field thermal radiation. Since near-field thermal radiation mode of heat transfer allow to higher heat fluxes than the far-field one, the heat flow between the two terminals would be higher if the lower terminal is kept at higher temperature, hence the effect of thermal rectification.

Figure 5:
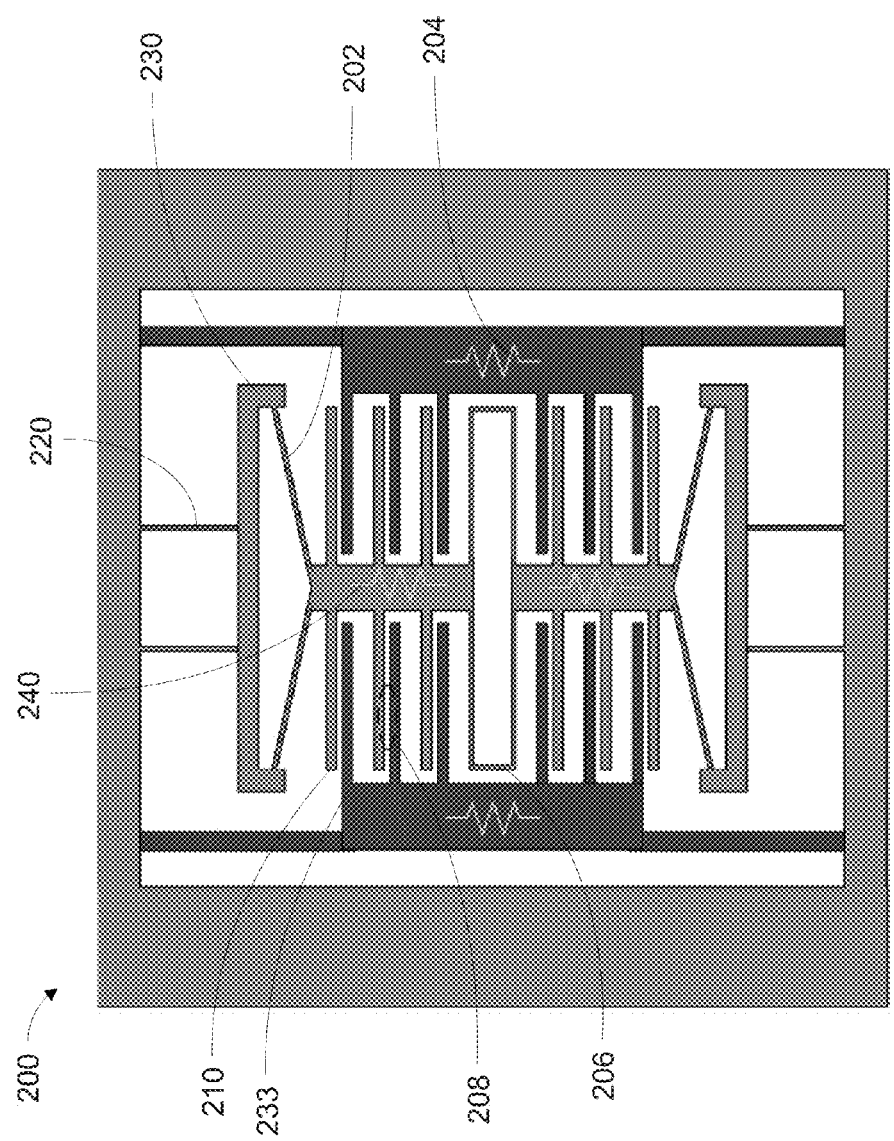
FIG. 5 is a schematic view of a thermomechanical memory/logic device in accordance with an embodiment of this disclosure.
Figure 6:
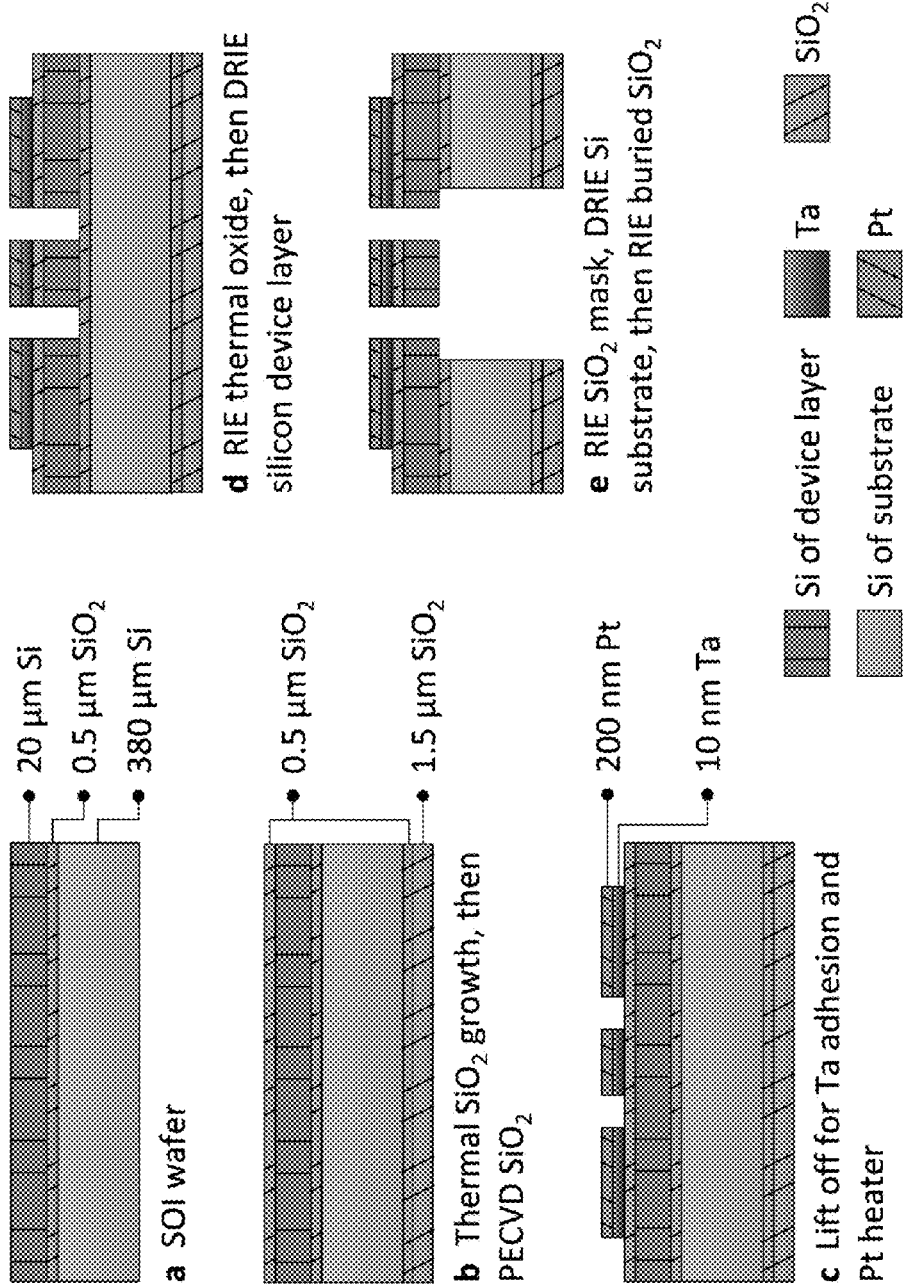
FIG. 6 shows cross-sectional views of the thermomechanical memory/logic device shown in FIG. 5 during fabrication steps.
Figure 7A:
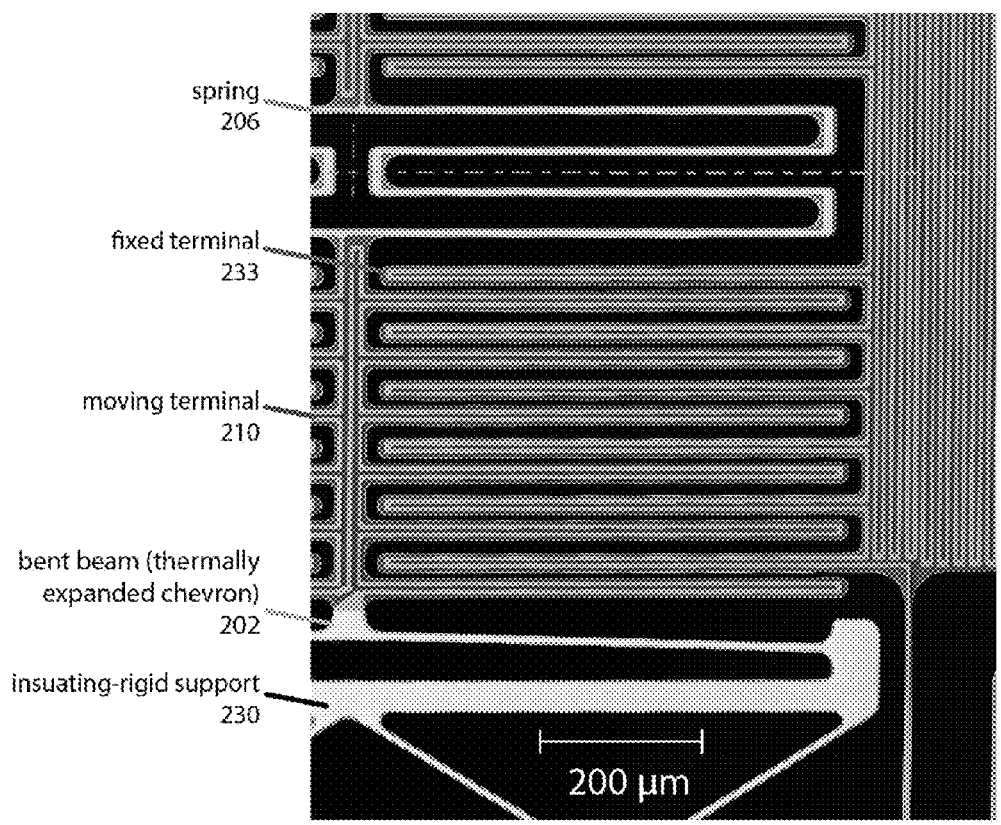
FIGS. 7A through 7D show various views of a physical prototype of the thermomechanical memory/logic device shown in FIG. 5.
Figure 7B:
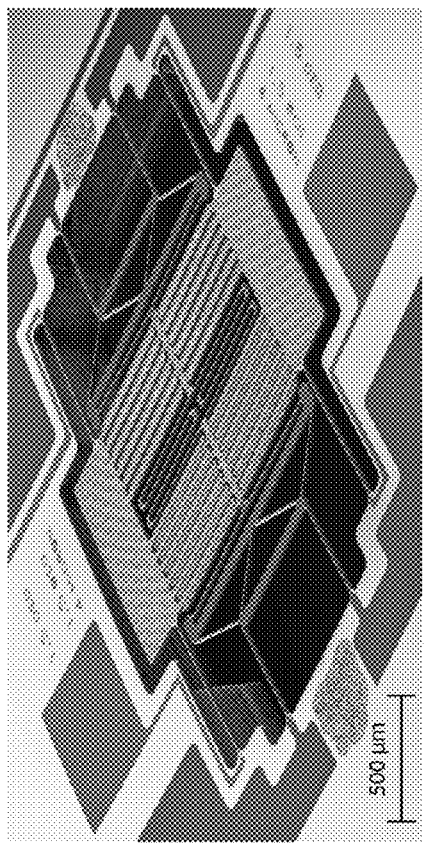
Figure 7D:
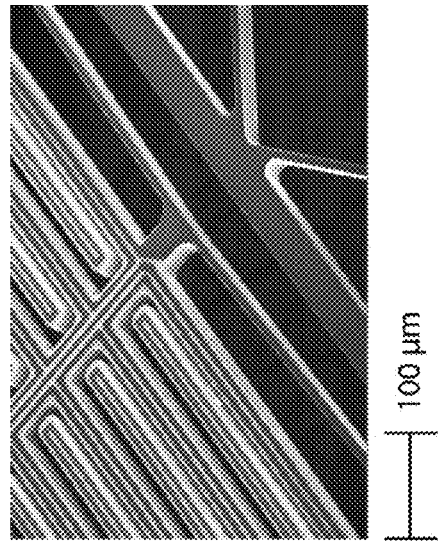
Figure 7C:
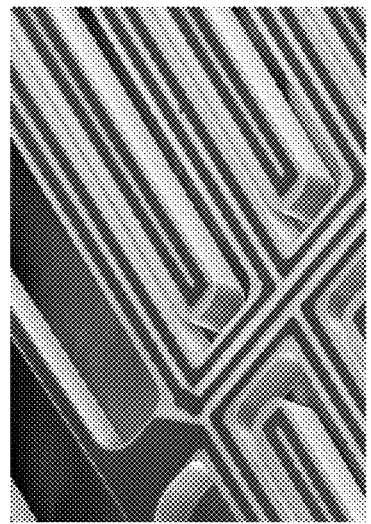

FIG. 5 is a schematic view of a thermomechanical device 200 designed for validation of the concepts described herein. The schematic shows multiple moving heads 210 connected to a common structure, which is connected to chevrons or bent beams 202 (i.e., the structure that can be thermally expanded). The common structure also includes a flexible spring 206. The chevron 202 is supported by a rigid support 230 which is connected to the cold terminal by thin supports 220 to reduce conduction losses (to make them comparable with thermal radiation heat supplied to the heads 210). The schematic also shows sets of fixed heads 233, which make up the hot terminal. The moving heads 210 can be activated or moved towards the fixed heads by heating them (and consequently heating the chevrons through thermal conduction) via a resistive coil(s) 240. The coil(s) 240 can then cause widening or narrowing of the variable nano-gaps between the moving heads 210 and the fixed heads 233. The fixed heads 233 also have a resistive coil(s) 204 that is used to manipulate their temperature. Both resistive coils implemented in the fixed and the moving heads act as heat sources, in addition to being used to measure heating rate and the electrical resistance of the coil(s) which can be related to the head's temperature. These measurements are essential in estimating the heat transfer between the fixed and moving terminals, as will be shown later. FIG. 6 shows cross-sectional views of various fabrication steps for the thermomechanical device 200. Fabrication of a prototype was conducted in a clean room environment using similar technologies used for fabrication of modern electronics. FIGS. 7A through 7D show various views of the prototype constructed in accordance with implementations of FIGS. 5 and 6. Numbering and labels in FIG. 7A correspond to numbering used in FIG. 5.

Figure 8A:
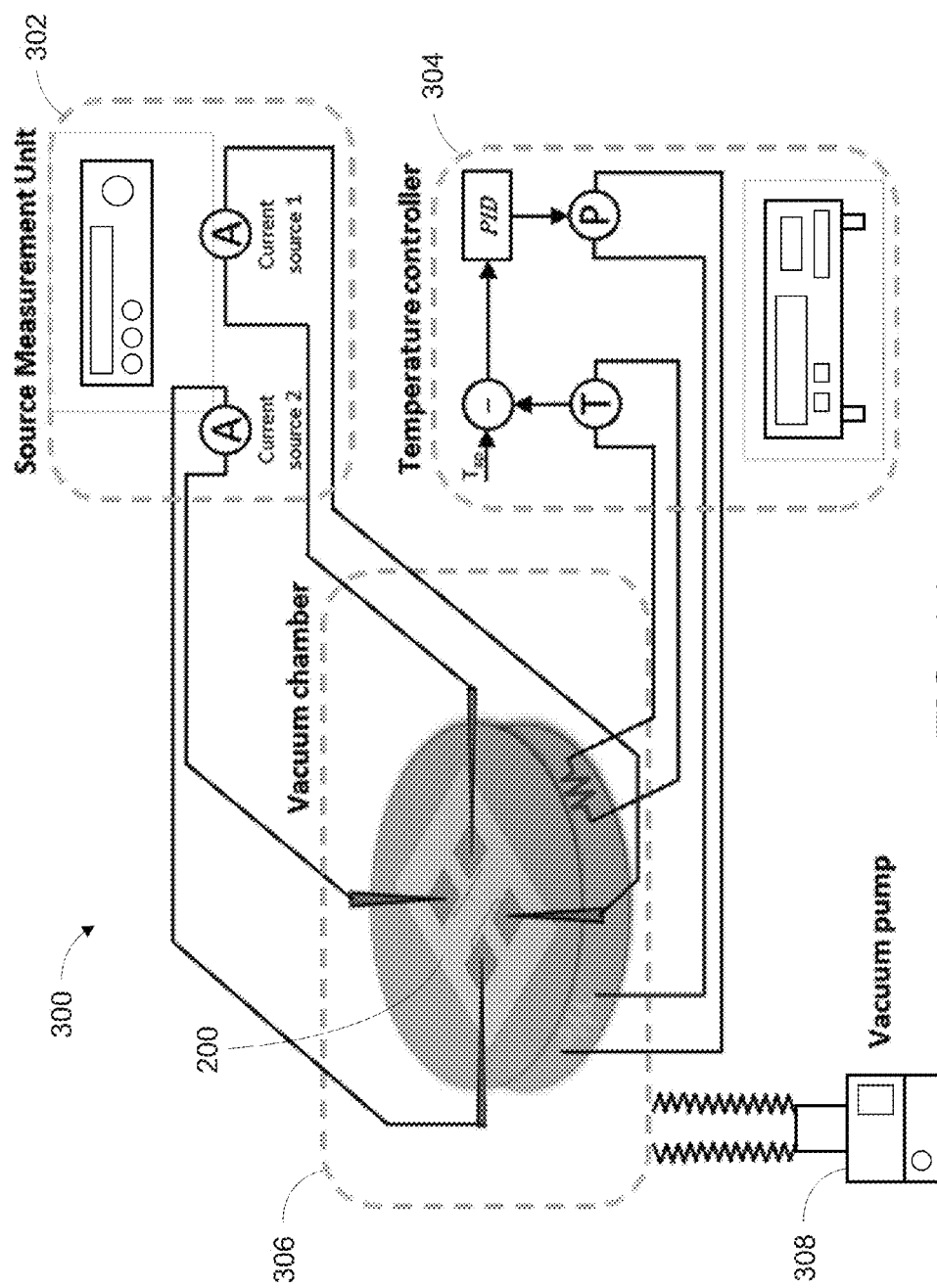
FIG. 8A shows a testing system for analyzing a thermomechanical device, such as the thermomechanical device shown in FIG. 5.
Figure 8B:
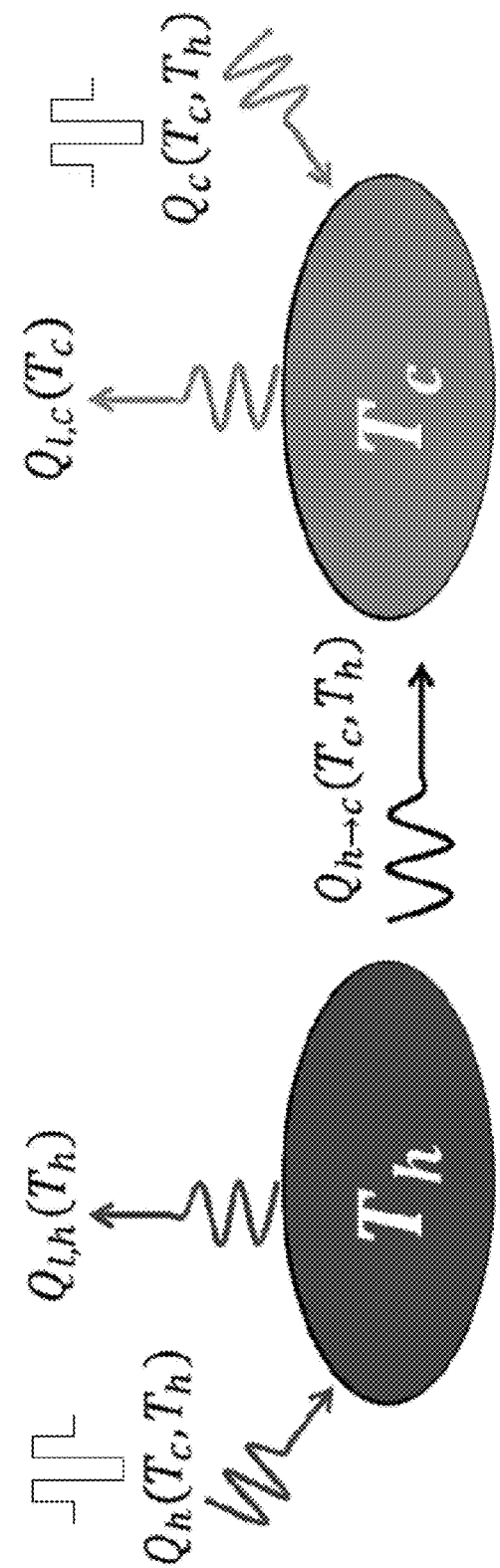
FIG. 8B shows a simplified model for heat transfer estimation between the two bodies incorporated in the thermomechanical device.
Figure 8C:
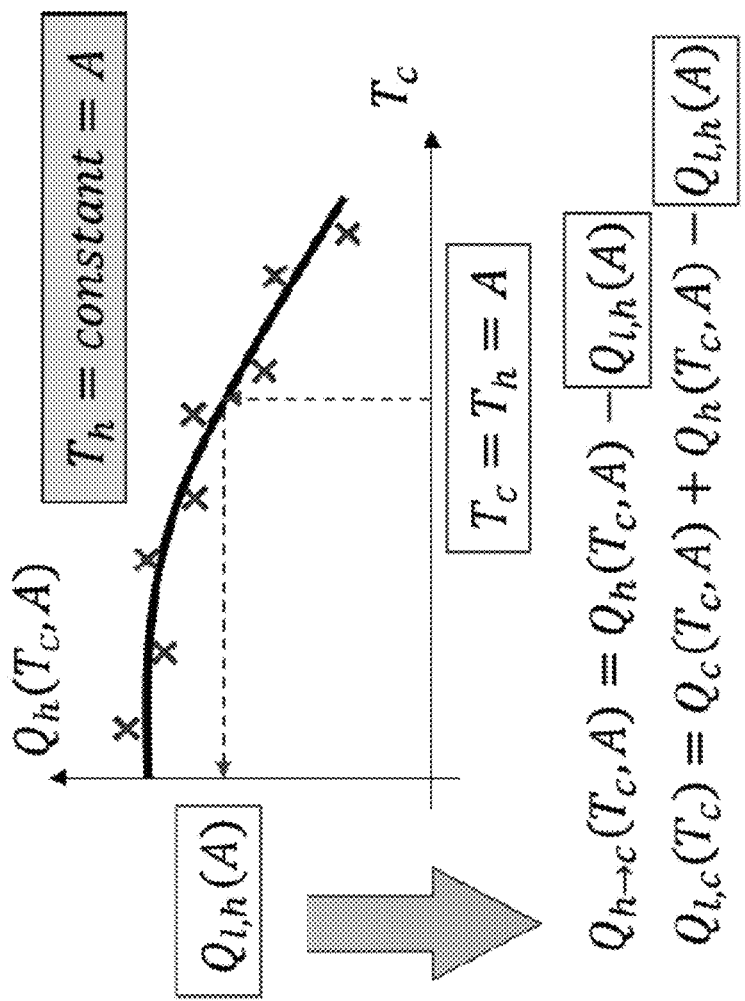
FIG. 8C shows a technique of estimation for the heat transfer between the two bodies, and the heat losses from each body.
Figure 8D:
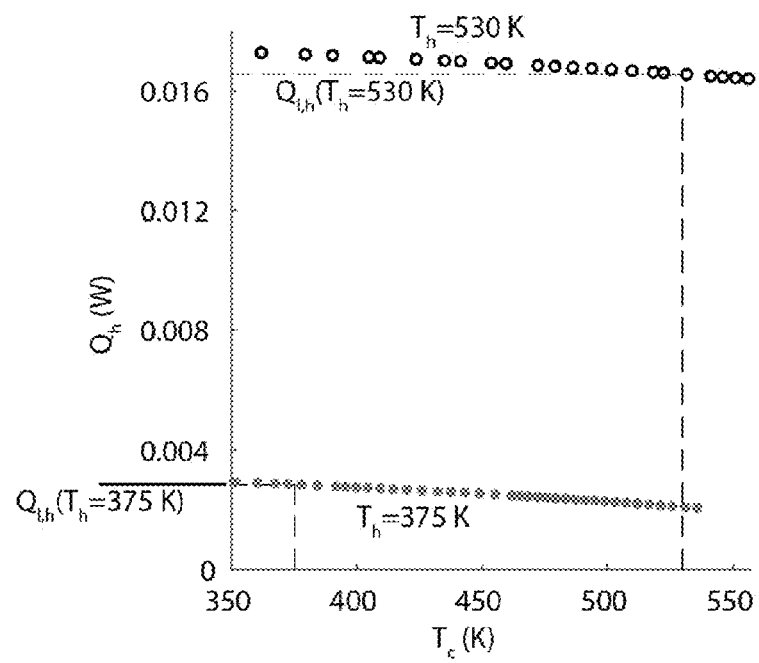
FIGS. 8D through 8G show measurements for a device such as shown in FIGS. 7A through 7D.
Figure 8E:
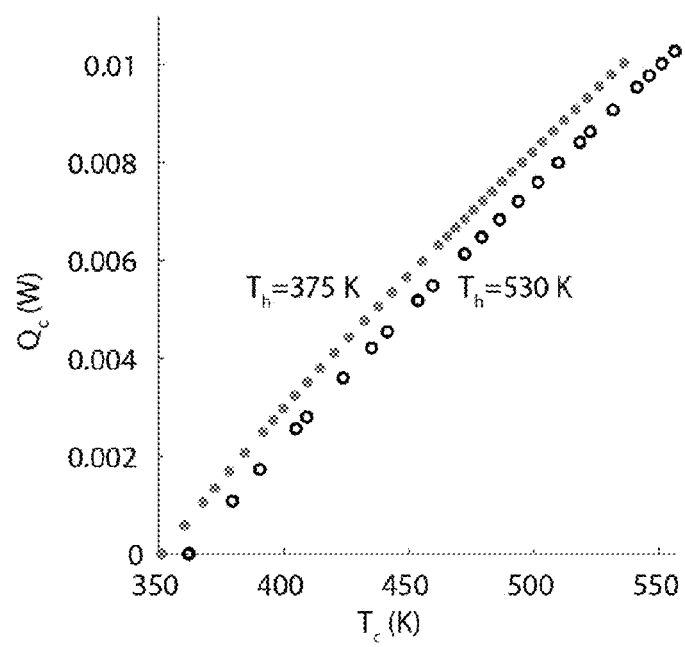
Figure 8F:
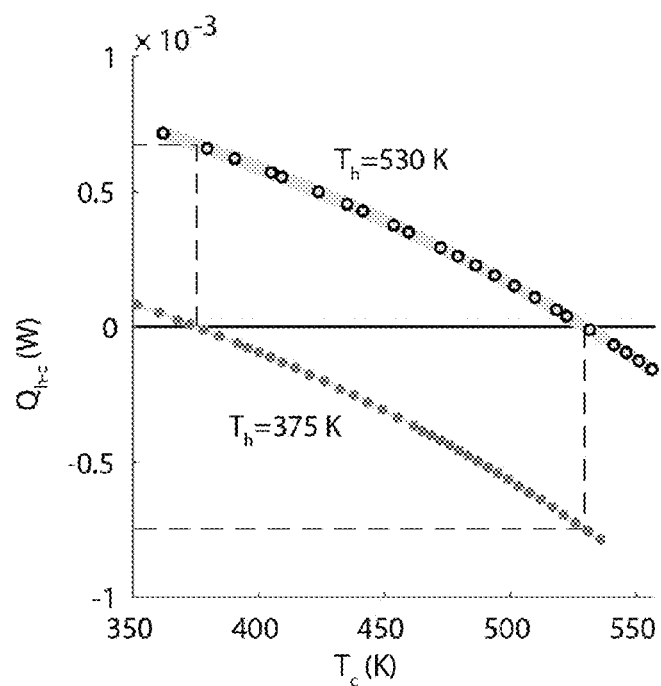
Figure 8G:
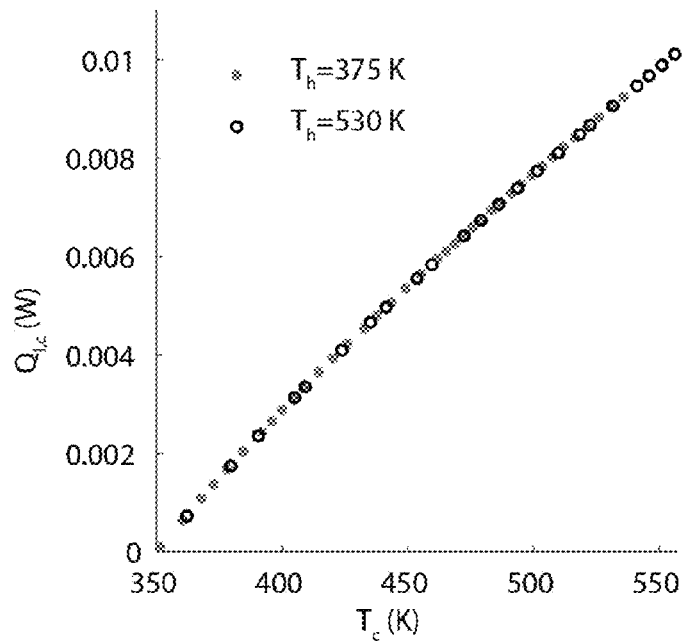
Figure 9A:
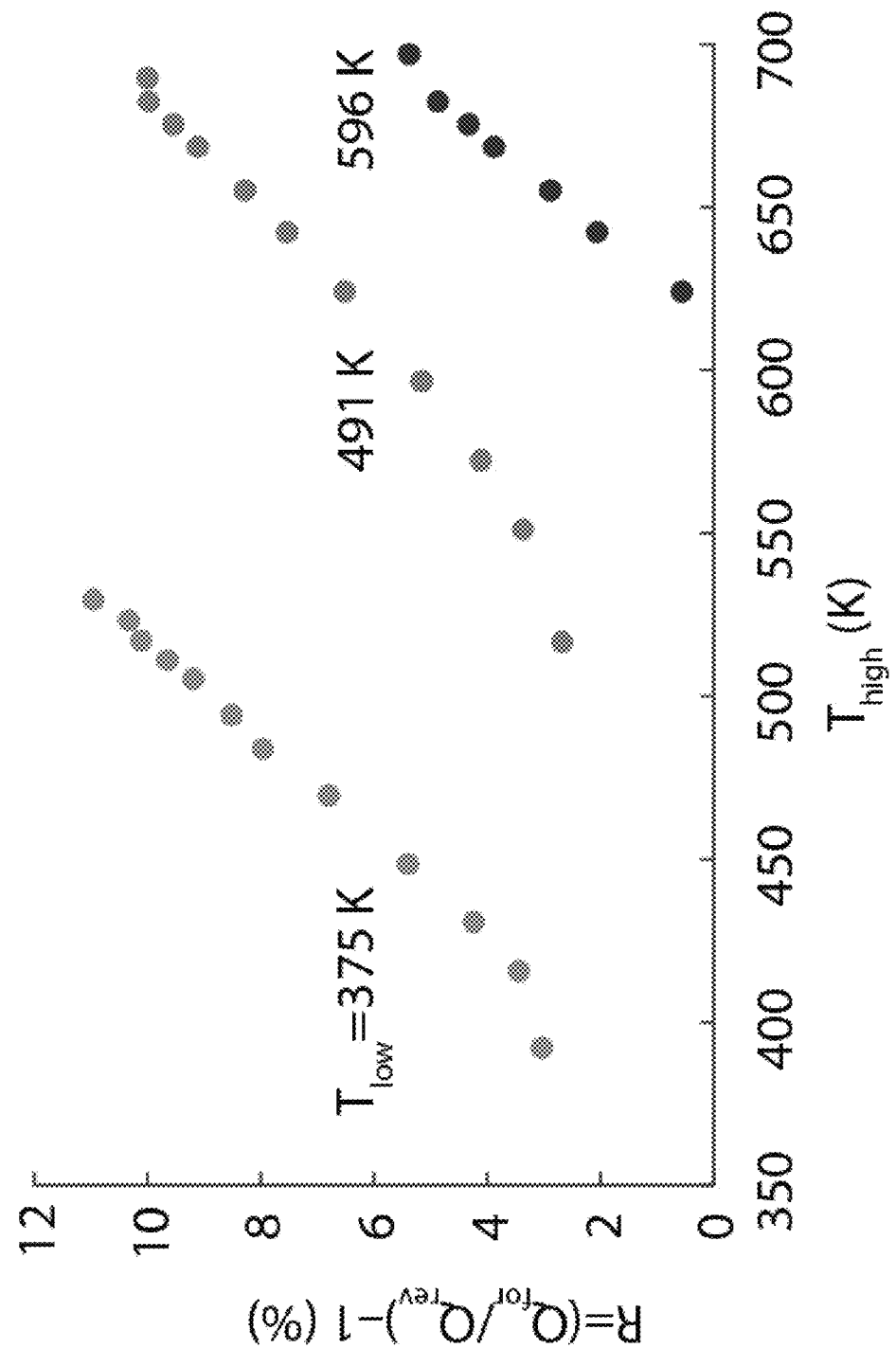
FIGS. 9A and 9B are plots of results obtained from testing the prototype of thermomechanical device shown FIGS. 7A through 7D.
Figure 9B:
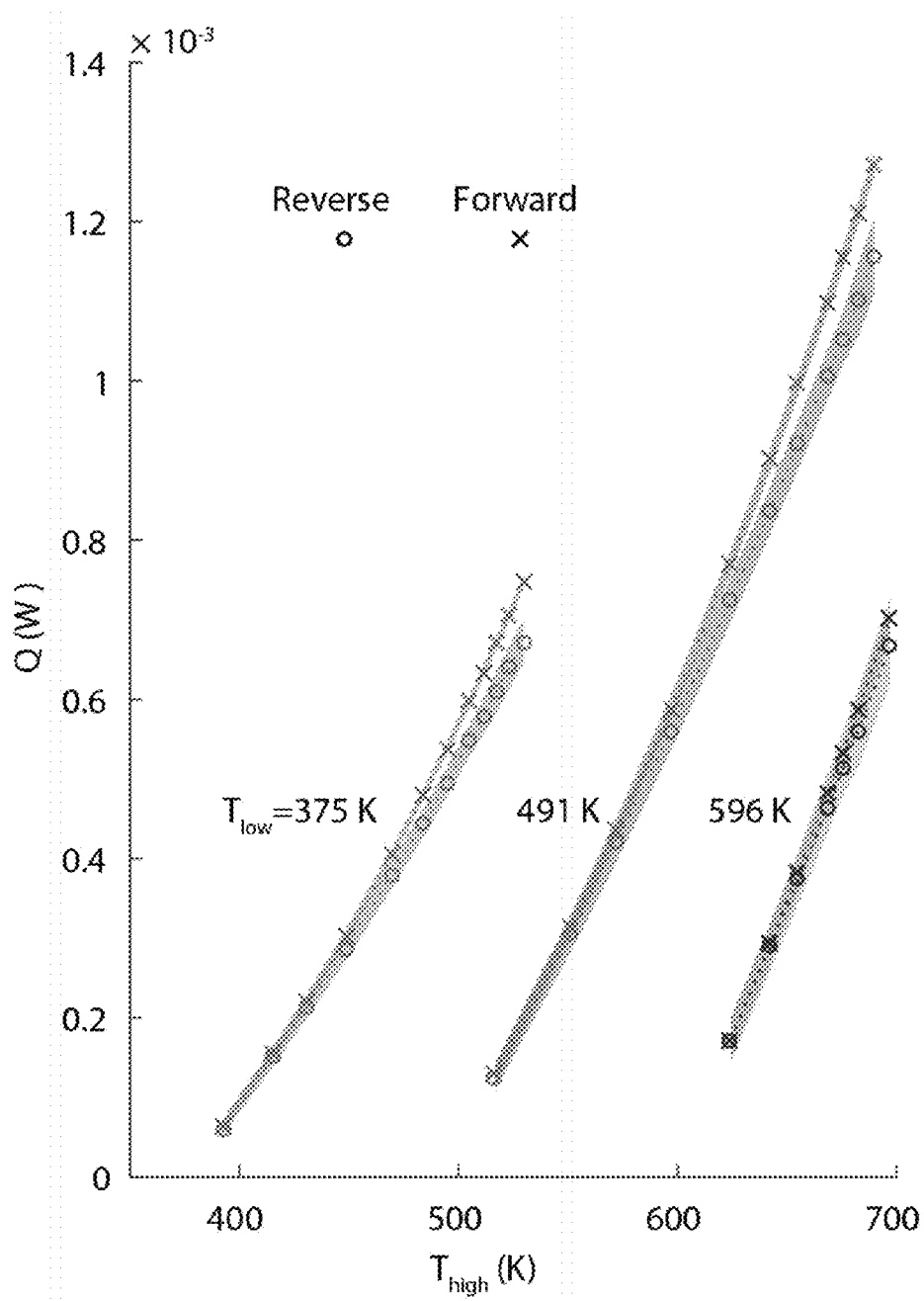

FIG. 8A shows an example test system 300 for analyzing a thermomechanical device, such as the thermomechanical device 200 shown in FIGS. 5 through 7D. The test system can include electrical power supply with an integrated electronic measuring instrument 302 (which is connected to the device 200), a temperature controller 304 configured to supply heat to the chuck where the device 200 is supported, and a vacuum chamber 306 configured to retain the device 200 during measurement, and a vacuum pump 308 configured to remove air from the vacuum chamber 306. FIG. 8B shows the simplified model for the prototype that is used to estimate the heat losses and heat transfer between the two bodies incorporated in the prototype. FIG. 8C shows the calculation procedure to estimate the heat losses and heat transfer between the two bodies. The calculation technique is based on keeping the hot body at fixed temperature, and changing the temperature of the cool body over a certain range. The heat power supplied to the hot body is plotted versus the temperature of the cold body as shown in FIG. 8C, then with curve fitting we can identify the point where the temperatures of the cold and hot bodies are equal (i.e., $T_h=T_c=A$). This point features no heat transfer between the hot and the cold bodies, and based on the first law of thermodynamics, and equations displayed in FIG. 8C it is possible to estimate losses from the hot body $Q_{l,h}(A)$, losses from the cold body at the range of the cool body temperature ($Q_{l,c}(T_c)$), and the heat transfer from the hot to the cool body when $T_h=A$, and for all the range of the cool body temperature ($Q_{h \to c}(T_c, A)$). FIGS. 8D through G show the measurement procedure for a device such as shown in FIGS. 7A through D, which has an initial separation gap between the fixed 233 and moving 210 terminals of 3 microns, and a bend beam (i.e., the chevrons) inclined 3 degrees relative to the horizontal. Temperatures of the cool and the hot bodies can be controlled using the printed platinum heating elements 204 and 240 (e.g., coils 204 and 240 shown schematically in FIG. 5), and supplied power and resistance can be measured by the measuring instrument 302 of the test system 300 shown in FIG. 8A. FIGS. 9A and 9B are plots of the obtained test results, validating thermal rectification operability by the thermomechanical device. Thermal rectification can be used for thermal management or for developing thermal logic devices.

It will be understood by those within the art that, in general, terms used herein, and are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

What is claimed is:

1. A thermomechanical device for achieving one of at least two states, comprising:
    a first thermally controlled terminal;
    a second thermally controlled terminal;
    a thermally expandable structure coupled to one of the first thermally controlled terminal or the second thermally controlled terminal;
    a thermally conductive head coupled to the thermally expandable structure, between the first thermally controlled terminal and the second thermally controlled terminal, wherein the thermally expandable structure expands or contracts in response to heat absorbed or given off by the thermally conductive head, causing the head to move towards or away from the first thermally controlled terminal; and
    a thermally controlled probe that heats or cools the thermally conductive head in order to selectively destabilize the thermally conductive head, thereby driving the thermally conductive head towards the first thermally controlled terminal or towards the second thermally controlled terminal.

2. The thermomechanical device of claim 1, wherein the thermally conductive head at least temporarily stabilizes and substantially ceases to move when the thermally conductive head reaches one of at least two temperatures.

3. The thermomechanical device of claim 2, wherein the thermally conductive head at least temporarily stabilizes and substantially ceases to move when the thermally conductive head reaches a first temperature associated with a first logic state or when the thermally conductive head reaches a second temperature associated with a second logic state.

4. The thermomechanical device of claim 3, wherein the first temperature and the second temperature are between a temperature of the first thermally controlled terminal and a temperature of the second thermally controlled terminal.

5. The thermomechanical device of claim 1, wherein the thermally expandable structure comprises one or more helical or zigzagged structures that couple the thermally conductive head to one of the first thermally controlled terminal or the second thermally controlled terminal.

6. The thermomechanical device of claim 1, wherein the thermally expandable structure comprises one or more linear segments that couple the thermally conductive head to one of the first thermally controlled terminal or the second thermally controlled terminal.

7. A thermomechanical device comprising:
    a first thermally controlled terminal;
    a second thermally controlled terminal;
    a thermally expandable structure, wherein the thermally expandable structure is coupled to the second thermally controlled terminal, and wherein the first thermally controlled terminal has a higher temperature than the second thermally controlled terminal; and
    a thermally conductive head coupled to the thermally expandable structure, between the first thermally controlled terminal and the second thermally controlled terminal, wherein the thermally expandable structure expands or contracts in response to heat absorbed or given off by the thermally conductive head, causing the head to move towards or away from the first thermally controlled terminal.

8. A thermomechanical memory/logic device, comprising:
    a hot terminal;
    a base;
    a thermally expandable structure coupled to the base; and
    a thermally conductive head coupled to the thermally expandable structure, between the hot terminal and the base, wherein the hot terminal is controlled to have a higher temperature than the base; and
    a thermally controlled probe that heats or cools the thermally conductive head in order to selectively destabilize the thermally conductive head with respect to the hot terminal, thereby driving the thermally conductive head towards or away from the hot terminal.

9. The thermomechanical memory/logic device of claim 8, wherein the thermally expandable structure expands or contracts in response to heat absorbed or given off by the thermally conductive head, causing the head to move towards or away from the hot terminal.

10. The thermomechanical memory/logic device of claim 9, wherein the thermally conductive head at least temporarily stabilizes with respect to the hot terminal and substantially ceases to move when the thermally conductive head reaches one of at least two temperatures.

11. The thermomechanical memory/logic device of claim 10, wherein the thermally conductive head at least temporarily stabilizes with respect to the hot terminal and substantially ceases to move when the thermally conductive head reaches a first temperature associated with a first logic state or when the thermally conductive head reaches a second temperature associated with a second logic state.

12. The thermomechanical memory/logic device of claim 11, wherein the first temperature and the second temperature are between a temperature of the hot terminal and a temperature of the base.

13. The thermomechanical memory/logic device of claim 8, wherein the thermally expandable structure comprises one or more helical or zigzagged segments that couple the base to the thermally conductive head.

14. The thermomechanical memory/logic device of claim 8, wherein the thermally expandable structure comprises one or more linear segments that couple the base to the thermally conductive head.

15. A thermomechanical device for achieving one of at least two states, comprising:
    a first thermally controlled terminal;
    a second thermally controlled terminal;
    a thermally expandable structure coupled to one of the first thermally controlled terminal or the second thermally controlled terminal; and
    a thermally conductive head coupled to the thermally expandable structure, between the first thermally controlled terminal and the second thermally controlled terminal, wherein the thermally expandable structure expands or contracts in response to heat absorbed or given off by the thermally conductive head, causing the head to move towards or away from the first thermally controlled terminal, wherein the thermally conductive head at least temporarily stabilizes and substantially ceases to move when the thermally conductive head reaches one of at least two temperatures including a first temperature associated with a first logic state and a second temperature associated with a second logic state, wherein the first temperature and the second temperature are between a temperature of the first thermally controlled terminal and a temperature of the second thermally controlled terminal.

16. A thermomechanical device for achieving one of at least two states, comprising:
a first thermally controlled terminal;
a second thermally controlled terminal;
a thermally expandable structure coupled to one of the first thermally controlled terminal or the second thermally controlled terminal; and
a thermally conductive head coupled to the thermally expandable structure, between the first thermally controlled terminal and the second thermally controlled terminal, wherein the thermally expandable structure expands or contracts in response to heat absorbed or given off by the thermally conductive head, causing the head to move towards or away from the first thermally controlled terminal, wherein the thermally expandable structure comprises one or more helical or zigzagged structures that couple the thermally conductive head to one of the first thermally controlled terminal or the second thermally controlled terminal.

* * * * *